(12) United States Patent  
Sumser et al.

(10) Patent No.: US 7,513,114 B2  
(45) Date of Patent: Apr. 7, 2009

(54) EXHAUST GAS TURBOCHARGER FOR A RECIPROCATING INTERNAL COMBUSTION ENGINE AND CORRESPONDING RECIPROCATING INTERNAL COMBUSTION ENGINE

(75) Inventors: Siegfried Sumser, Stuttgart (DE); Wolfram Schmid, Nürtingen (DE); Helmut Finger, Leinfelden-Echterdingen (DE)

(73) Assignee: Daimler AG, Stuttgart (DE)

( * ) Notice: Subject to any disclaimer, the term of this patent is extended or adjusted under 35 U.S.C. 154(b) by 140 days.

(21) Appl. No.: 11/645,123

(22) Filed: Dec. 22, 2006

(65) Prior Publication Data

US 2007/0180826 A1 Aug. 9, 2007

Related U.S. Application Data

(63) Continuation-in-part of application No. PCT/EP2005/006610, filed on Jun. 18, 2005.

(30) Foreign Application Priority Data

Jun. 25, 2004 (DE) .................. 10 2004 030 703

(51) Int. Cl.  
*F02D 23/00* (2006.01)  
*F01D 1/02* (2006.01)  
*F01D 5/14* (2006.01)  
*F04D 29/44* (2006.01)  
*F04D 29/54* (2006.01)  
*F02B 37/02* (2006.01)  
*F02B 37/22* (2006.01)  
*F02M 25/07* (2006.01)

(52) U.S. Cl. .................. 60/602; 60/605.2; 415/205; 415/151

(58) Field of Classification Search .................. 60/602, 60/605.2; 417/406–409; 415/205, 116, 151; *F02B 37/02, F02B 37/22, 29/04; F02M 25/07, 25/06; F01D 5/14*  
See application file for complete search history.

(56) References Cited

U.S. PATENT DOCUMENTS

| | | | | |
|---|---|---|---|---|
| 4,179,892 | A * | 12/1979 | Heydrich | 60/605.2 |
| 6,216,459 | B1 * | 4/2001 | Daudel et al. | 60/605.2 |
| 6,694,735 | B2 * | 2/2004 | Sumser et al. | 60/605.2 |
| 2003/0115875 | A1 | 6/2003 | Sumser et al. | 60/605.2 |

FOREIGN PATENT DOCUMENTS

| | | |
|---|---|---|
| DE | 101 52 804 | 5/2003 |
| WO | WO 9900589 A1 * | 1/1999 |
| WO | WO 2004/031552 | 4/2004 |

* cited by examiner

*Primary Examiner*—Thai-Ba Trieu  
(74) *Attorney, Agent, or Firm*—Klaus J. Bach

(57) ABSTRACT

In an exhaust gas turbocharger for a reciprocating internal combustion engine comprising an exhaust gas turbine in the exhaust line and a compressor in the inlet line of the engine, the exhaust gas turbine has two exhaust gas flow passages, by way of which exhaust gas is fed to the turbine rotor, the ratio of the turbine rotor diameter to the compressor wheel diameter being set by a function, which is dependent on the displacement volume of the internal combustion engine.

7 Claims, 3 Drawing Sheets

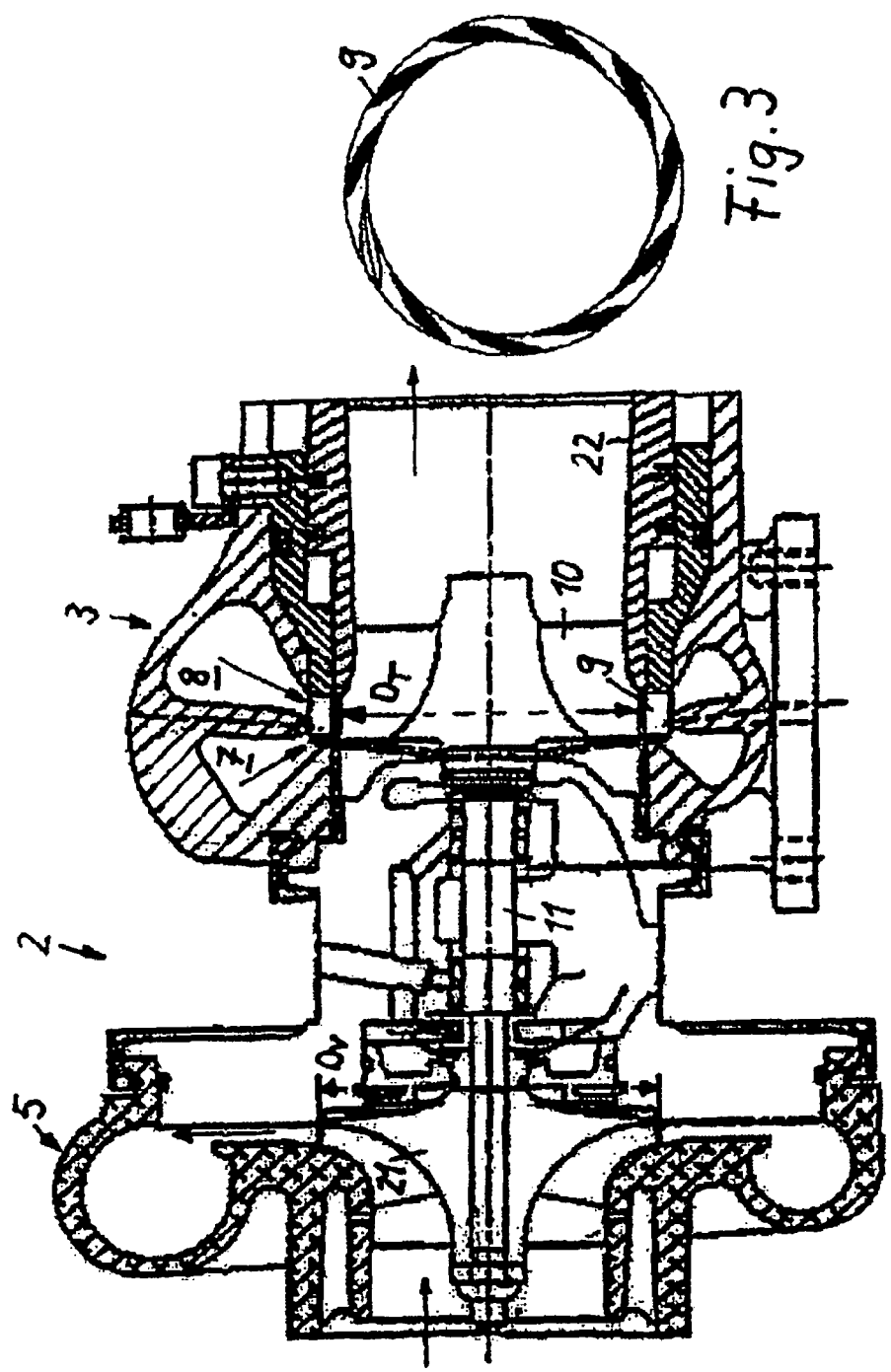

EXHAUST GAS TURBOCHARGER FOR A RECIPROCATING INTERNAL COMBUSTION ENGINE AND CORRESPONDING RECIPROCATING INTERNAL COMBUSTION ENGINE

This is a Continuation-In-Part Application of pending International Patent Application PCT/EP2005/006610 filed Jun. 18, 2005 and claiming the priority of German Patent Application 10 2004 030 703.2 filed Jun. 25, 2004.

BACKGROUND OF THE INVENTION

The invention relates to an exhaust gas turbocharger for a reciprocating internal combustion engine and to a c reciprocating internal combustion engine including an exhaust gas turbocharger to which exhaust gas is supplied from the internal combustion engine via two separate exhaust ducts.

DE 101 52 804 A1 describes an exhaust gas turbocharger for an internal combustion engine, which comprises an exhaust gas turbine in the exhaust manifold and a compressor in the inlet manifold, the turbine rotor being driven by the pressurized exhaust gases from the internal combustion engine and the rotation of the turbine rotor being transmitted by a shaft to the compressor wheel, which thereupon draws in ambient air and compresses it to a higher boost pressure. The exhaust gas turbine has two exhaust gas flow passages of different sizes, which are each supplied with the exhaust gases from one of two cylinder banks of the internal combustion engine. Owing to the differing sizes of the exhaust gas flow passages, a higher exhaust gas backpressure is created in the exhaust line section of the smaller exhaust gas flow passage than in the exhaust line section via which the larger exhaust gas flow is supplied with exhaust gases. This higher exhaust gas backpressure can be utilized for improved exhaust gas recirculation, which comprises a recirculation line, which branches off from the exhaust gas line section of the smaller exhaust gas flow passage and extends to the inlet manifold. The exhaust gas recirculation improves the exhaust properties, serving in particular to reduce $NO_x$ emissions. In addition, exhaust gas recirculation with asymmetrical turbine inlet flow passages leads to favorable fuel consumption.

Based on this state of the art, it is the object of the present invention to further reduce the emissions and fuel consumption of supercharged internal combustion engines. In particular, the efficiency of the exhaust gas turbocharger of an internal combustion engine is to be improved.

SUMMARY OF THE INVENTION

In an exhaust gas turbocharger for a reciprocating internal combustion engine comprising an exhaust gas turbine in the exhaust line and a compressor in the inlet line of the engine, the exhaust gas turbine has two exhaust gas flow passages, by way of which exhaust gas be fed to the turbine rotor. In accordance with the invention, the efficiency of the turbine is improved in that the ratio of the turbine rotor diameter to the compressor wheel is selected so as to exceed a linear function, which depends substantially on the total displacement volume of the internal combustion engine and the degree of asymmetry specific to the turbine, the degree of asymmetry representing the ratio of the choke flow rate parameters for the two exhaust gas flow passages. This relationship serves to ensure that the turbine rotor diameter has a defined minimum size compared to the compressor wheel diameter, which affords the advantage that the circumferential speed increases on the outer diameter of the turbine rotor thereby also improving the turbine efficiency. This improvement in efficiency compensates for an inherent impairment of efficiency brought about by the asymmetrical design of the two exhaust gas flow passages of the exhaust gas turbine. Such an asymmetrical configuration of the exhaust gas flow passages, however, is desirable for effective exhaust gas recirculation, which improves the exhaust emission properties and has a favorable influence on fuel consumption. The advantage of exhaust gas recirculation can therefore be combined with the advantage of improved turbine efficiency. These two measures in conjunction lead to improved exhaust emissions and lower fuel consumption.

Exerting a linear influence on the ratio of the turbine rotor diameter to the compressor wheel diameter is a parameter which is determined as a function of the total displacement volume of a particular internal combustion engine. A function which varies according to the root of the displacement volume can be provided for calculating this parameter. The value of this parameter is approximately 4% of the root of the total displacement volume of the internal combustion engine, measured in liters.

The relevant diameters of the turbine rotor and the compressor wheel are the respective maximum diameters. For the compressor wheel this is the area of the outlet cross section and for the turbine rotor it is the area of the inlet cross-section.

The exhaust gas turbocharger is preferably used for a reciprocating internal combustion engine, which is equipped with an exhaust gas recirculation device for returning exhaust gas from the exhaust manifold into the inlet manifold. The return line of the exhaust gas recirculation device branches off from the exhaust manifold line section of the smaller exhaust gas flow passage, in which a higher exhaust gas backpressure builds up than in the exhaust line section of the larger exhaust gas flow passage. This higher exhaust gas backpressure can be used for an efficient exhaust gas recirculation in wide operating ranges of the internal combustion engine.

In a particular embodiment, the exhaust gas turbine is equipped with a variable turbine inlet vane structure for adjusting the effective turbine inlet cross section. The turbine voice structure is, for example, a guide vane ring with adjustable guide vanes, and possibly also a guide vane ring which is axially displaceable in the turbine inlet flow cross section. In each case the variable guide vane structure is to be adjusted between a choke position minimizing the turbine inlet flow cross section and an opening position providing for a maximum flow inlet cross section. The variable turbine guide vane structure suitably extends into the inlet flow cross section of the larger exhaust gas flow passage. It may be expedient, however, to provide a variable turbine guide vane structure either additionally or alternatively in the flow inlet cross section of the smaller exhaust gas inlet flow passage.

The invention will become more readily apparent from the following description of preferred embodiments on the basis of the accompanying drawings:

BRIEF DESCRIPTION OF THE DRAWINGS

FIG. 2 is a sectional view of an exhaust gas turbocharger, the exhaust gas turbine likewise being of double-flow design, FIG. 3 shows a guide vane ring with variable guide vanes which is arranged in the inlet flow cross-section of the exhaust gas turbine.

DESCRIPTION OF PARTICULAR EMBODIMENT

Figure 1:
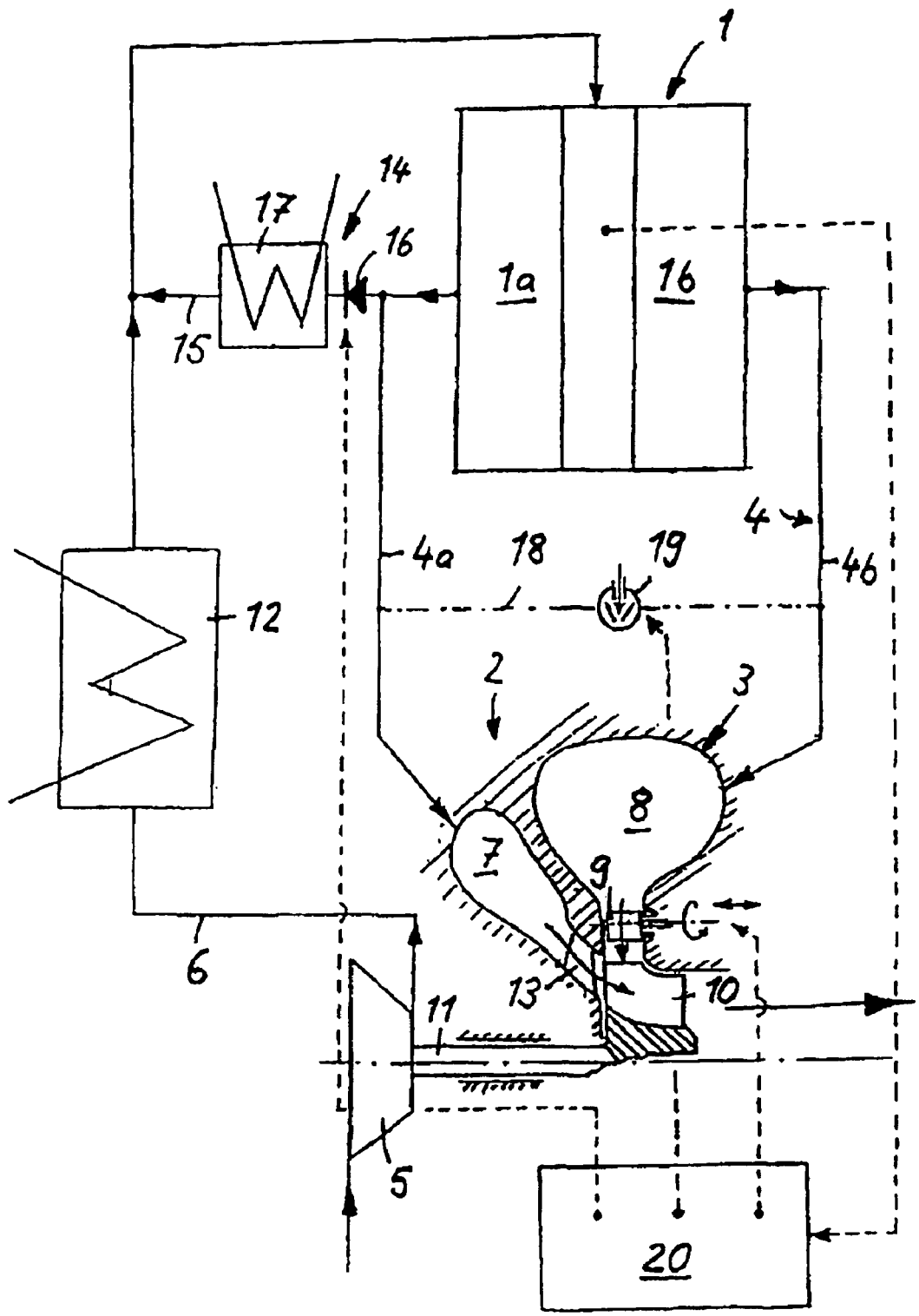
FIG. 1 shows schematically a supercharged internal combustion engine having a double-flow exhaust gas turbine.

The internal combustion engine 1 represented in FIG. 1 is a spark-ignition engine or a diesel engine having two separate cylinder banks 1a and 1b. An exhaust gas turbocharger 2 having an exhaust gas turbine 3 in the exhaust manifold 4 and a compressor 5 in the inlet manifold 6 is assigned to the internal combustion engine 1. The turbine rotor 10 of the exhaust gas turbine 3 is driven by the pressurized exhaust gases from the internal combustion engine, the rotation of the turbine rotor 10 being transmitted by way of a shaft 11 to the compressor wheel in the compressor 5, whereupon ambient air is drawn into the inlet manifold 6 and is compressed to a higher boost pressure. The compressed air is then cooled in an air intercooler 12 downstream of the compressor 5 before subsequently being delivered at boost pressure to the cylinders of the internal combustion engine 1.

The exhaust gas turbine is of double-flow construction and has a first, smaller exhaust gas flow passage 7 and a second, larger exhaust gas flow passage 8, which are each in communication, by way of a flow passage or turbine inlet cross-section with the turbine rotor 10. Each of the two exhaust gas flow passages 7 and 8 is connected by way of a separate exhaust line section 4a and 4b to the cylinder outlets of a cylinder bank 1a and 1b respectively, so that only the exhaust gases from the respective cylinder bank 1a or 1b are fed to the exhaust gas flow passage 7 and 8 respectively.

A variable turbine inlet vane structure 9, which is embodied in particular as a guide vane system with adjustable guide vanes, is arranged in the inlet flow cross section of the larger exhaust gas flow passage 8. Also, an axially adjustable guide vane system is feasible. Through adjustment of the variable turbine guide vane structure 9, the effective flow inlet cross section can be adjusted between a minimum choke position and a maximum opening position.

In order to obtain an improved incident flow to the turbine rotor 10, a fixed vane system 13 may be arranged in the flow inlet cross section of the smaller exhaust gas flow passage 7. However, a variable turbine guide vane structure may also be arranged in the flow inlet cross section of the smaller exhaust gas flow passage 7.

The pressurized exhaust gases flowing into the exhaust gas flow passages 7 and 8 are led via the turbine inlet cross sections to the turbine rotor 10, which is rotated thereby. The exhaust gases subsequently leave the exhaust gas turbine 3 axially in an expanded state.

Also assigned to the internal combustion engine 1 is an exhaust gas recirculation device 14, which comprises an exhaust gas return line 15, an adjustable recirculation valve 16 and an exhaust gas cooler 17. Upstream of the exhaust gas turbine 3, the return line 15 branches off from the line section 4a of the exhaust manifold, which is assigned to the smaller exhaust gas flow passage 7, and opens into the inlet manifold 6 downstream of the air intercooler 12. In operating states in which a pressure in excess of the inlet manifold pressure prevails in the line section 4a, exhaust gas can be fed from the exhaust manifold into the inlet manifold by opening of the recirculation valve 16.

A bypass line 18, into which a diverter valve 19 is incorporated, may extend between the two line sections 4a and 4b of the exhaust manifold 4. By opening of the diverter valve 19 a pressure balance between the two line sections 4a and 4b can be established.

A feedback and control unit 20 may serve to adjust all adjustable units of the internal combustion engine 1, such as the variable turbine inlet vane structure 9, the return valve 16 and the diverter valve 19 as a function of engine operating variables.

FIG. 2 is a sectional view of an exhaust gas turbocharger. The exhaust gas turbine 3 has the two exhaust gas flow passages 7 and 8, which each have a radial flow inlet cross section to the turbine rotor 10; the turbine 3 is therefore a radial flow turbine. The smaller exhaust gas flow passage 7 is situated on the bearing side of the exhaust gas turbocharger facing the compressor 5, the larger exhaust gas flow passage 8 on the other hand is disposed at the side of the turbine outlet 22.

In an alternative embodiment it may also be appropriate, however to orient at least one of the exhaust gas flow passages axially or rather semi-axially ahead of the turbine rotor. In this case the turbine is a combined-flow turbine. Such a turbine is represented schematically by way of example in FIG. 1.

As can also be seen from FIG. 2, the variable turbine inlet vane structure 9, which is in particular situated in the inlet flow cross-section of the larger exhaust gas flow passage 8 to the turbine rotor 10, is an axially displaceable guide vane system, which can be shifted from an inoperative position outside the inlet flow cross section into an operative position in the inlet flow cross section. A guide vane system with adjustable guide vanes is also feasible as an alternative to an axially displaceable guide vane system. In addition it is also possible to provide a variable turbine geometry also in the inlet flow cross section of the smaller exhaust gas flow passage 7. It is also possible to provide a common variable turbine inlet vane structure, which extends over both flow inlet cross sections.

The turbine rotor 10 has a maximum diameter $D_T$, which denotes the outside diameter of the turbine rotor blades, in the area of the inlet flow cross section. The compressor wheel 21 has its maximum outside diameter $D_V$ in the area of its radial flow outlet. The ratio $D_T/D_V$ of the turbine rotor diameter $D_T$ to the compressor diameter $D_V$ is governed by the relationship $$D_T/D_V > J K^* \text{Asy},$$

where J denotes a constant in the range between 1 and 1.05 and preferably assumes a value of 1.05. K is a parameter which varies as function of the total displacement volume VH of the internal combustion engine according to the relationship $$K = 0.15\sqrt{\frac{V_H}{14}} \approx 0.04\sqrt{V_H}$$

K is here to be determined as a function of the displacement volume VH measured in liters. The term Asy denotes a turbine-specific degree of asymmetry, which is to be determined according to the relationship $$\text{Asy} = \Phi_{1,S}/\Phi_{2,S}$$

as a function of the critical flow rate parameter $\Phi_{1,S}$ in the area of the choke limit for the first exhaust gas flow passage 7 of the exhaust gas turbine 3 and the corresponding flow rate parameter $\Phi_{2,S}$ for the second exhaust gas flow passage 8 of the exhaust gas turbine 3.

The flow rate parameters $\Phi_{1,S}$ and $\Phi_{2,S}$ at the choke limit assume turbine-specific values, which are determined empirically for the respective exhaust gas turbine used or measured by shutting off one exhaust gas flow passage at a time and determining the critical flow rate parameter of the other, open exhaust gas flow passage. The flow rate parameter $\Phi$ is generally determined according to the correlation $$\varphi = \dot{m}_S \sqrt{T_S}/p_S,$$

where $m_S$ is the exhaust gas mass rate of flow through the exhaust gas flow passage in the area of the choke limit of the exhaust gas turbine, $T_S$ is the exhaust gas temperature in the exhaust gas flow passage in the area of the choke limit and $p_S$ is the exhaust gas pressure in the exhaust gas flow passage, likewise in the area of the choke limit.

Figure 4:
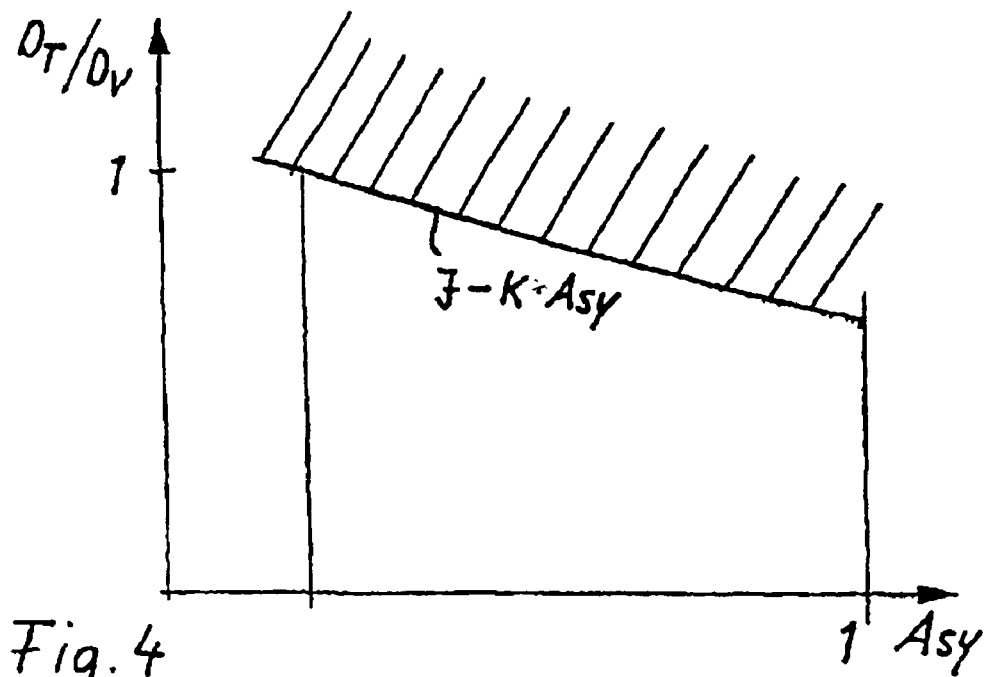
FIG. 4 shows a graph of the ratio of the turbine rotor diameter and the compressor wheel diameter as a function of the degree of asymmetry specific to the turbine, indicating the ratio of the choke flow rate parameters for the two exhaust gas flow passages of the exhaust gas turbine.

FIG. 4 represents the ratio between diameters $D_T/D_V$ described as a function of the degree of asymmetry Asy. The preferred range of values which the ratio between diameters $D_T/D_V$ should assume lies above a boundary line, which is represented by the straight line J–K*Asy. For a given compressor wheel diameter $D_V$ this ratio between the diameters may be expressed as the minimum size or as the increase in diameter for the turbine rotor diameter $D_T$. This increase in diameter raises the turbine efficiency $\eta_T$, thereby compensating or possibly even over-compensating for efficiency losses, which can occur owing to the asymmetrical configuration of the exhaust gas flow passages.

Figure 5:
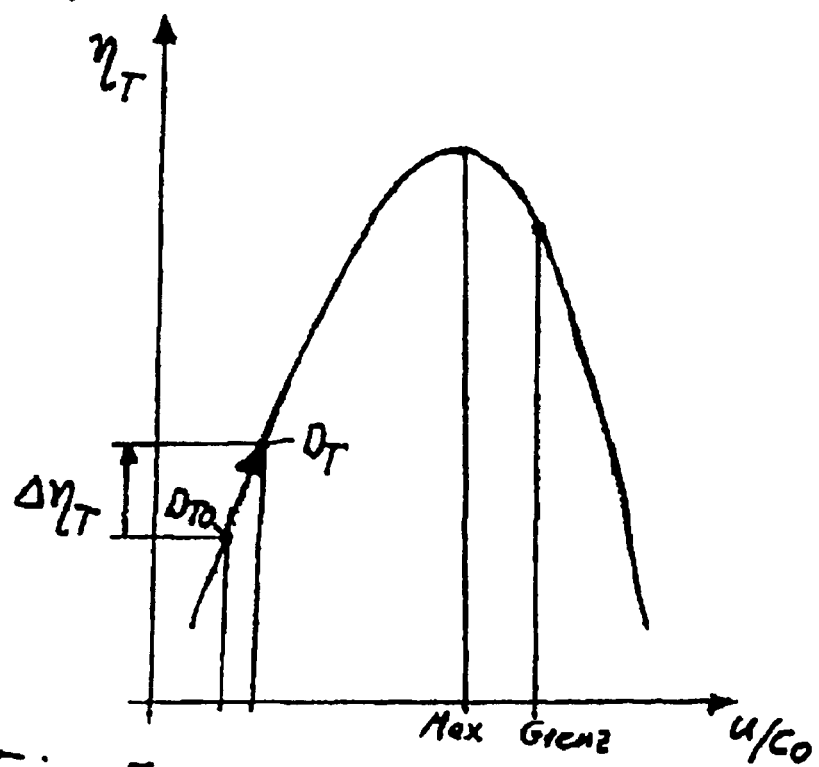
FIG. 5 shows the curve of the turbine efficiency as a function of the high-speed index, which is defined as the ratio of the circumferential speed of the turbine rotor and the isentropic velocity of the exhaust gas due to expansion in the turbine.

The increase in the turbine efficiency $\eta_T$ is illustrated in FIG. 5. This graph shows the curve for the turbine efficiency $\eta_T$ as a function of the high-speed index $u/C_0$, where u denotes the circumferential speed and $c_0$ denotes the isentropic expansion velocity. Since the circumferential speed is proportional to the turbine rotor diameter $D_T$, an increase in the turbine diameter also produces an increase in the turbine efficiency, which in the graph according to FIG. 5 is represented, for example, by the increase in the turbine diameter $D_{T0}$ to $D_T$ accompanied by an increase in the turbine efficiency by a value of $\Delta\eta_T$.

The maximum on the efficiency curve is reached at the point Max, which typically for exhaust gas turbines lies in an order of magnitude $u/uc_0 = 0.7$. An advisable limit for the high speed index is beyond the maximum for the efficiency at $u/c_0$=limit, a suitable numerical value for the limit being approximately 0.85.

What is claimed is:

1. An exhaust gas turbocharger for a reciprocating internal combustion engine including a plurality of cylinders with a displacement volume $V_H$ and an inlet line (6), and with an exhaust line (4a, 4b), said exhaust gas turbocharger (2), having an exhaust gas turbine (3) with a turbine rotor (10) in the exhaust line (4) and a compressor (5) with a compressor wheel (21) in the inlet line (6), the exhaust gas turbine (3) having at least first and second exhaust gas inlet flow passages (7, 8), by way of which exhaust gas is to be fed to the turbine rotor (10), the ratio $D_T/D_V$ of the turbine rotor diameter $D_T$ to the compressor wheel diameter $D_V$ being governed by the relationship $$D_T/D_V > JK^*Asy,$$

wherein

J denotes a constant in the range between 1 and 1.05.

K denotes a parameter which varies as function of the swept volume $V_H$ of the internal combustion engine (1), which is to be determined according to the relationship $$K = 0.15 \sqrt{V_H/14} \approx 0.04 \sqrt{V_H}$$

as a function of the displacement volume $V_H$ measured in liters, and

Asy denotes a turbine-specific degree of asymmetry, which is to be determined according to the relationship $$Asy = \Phi_{1,S}/\Phi_{2,S}$$

as a function of the critical flow rate parameter $\Phi_{1,S}$ in the area of the choke limit for the first exhaust gas flow passage (7) of the exhaust gas turbine (3) and the corresponding flow rate parameter $\Phi_{2,S}$ for the second exhaust gas flow passage (8) of the exhaust gas turbine (3).

2. The exhaust gas turbocharger as claimed in claim 1, wherein the two exhaust gas flow passages (7, 8) are of different sizes and have different flow cross-sections.

3. The exhaust gas turbocharger as claimed in claim 2, wherein the smaller exhaust gas flow passage (7) of the exhaust gas turbine (3) is arranged on the bearing side of the exhaust gas turbocharger (2) facing the compressor (5).

4. The exhaust gas turbocharger as claimed in claim 1, wherein the exhaust gas turbine (3) is equipped with a variable turbine guide vane structure (9) for variable adjustment of the effective turbine inlet flow cross-section.

5. The exhaust gas turbocharger as claimed in claim 4, wherein the variable turbine guide vane structure (9) is arranged in the turbine inlet flow cross-section of the larger exhaust gas flow passage (8).

6. The exhaust gas turbocharger as claimed in claim 1, wherein the exhaust gas turbine (3) is a radial flow turbine.

7. A reciprocating internal combustion engine including a plurality of cylinders with a displacement volume $V_H$ and having an exhaust gas turbocharger, the engine having an inlet line (6) and first and second exhaust gas lines (4a, 4b), one (4a) leading to a smaller exhaust gas flow passage 7 and the other to a larger exhaust gas flow passage (8), the exhaust gas turbocharger including an exhaust gas recirculation device (14), comprising a recirculation line (15) extending between the first exhaust gas line (4a), which leads to the smaller exhaust gas flow passage (7) and also to the inlet line (6) of the internal combustion engine (1), and the recirculation line (15) branching off from the exhaust gas line (4a) leading to the smaller exhaust gas flow passage (7), said exhaust gas turbocharger (2) having an exhaust gas turbine (3) with a turbine rotor (10) in the exhaust gas line (4) and a compressor (5) with a compressor wheel (21) in the inlet line (6), the exhaust gas turbine (3) having at least first and second exhaust gas inlet flow passages (7, 8), for feeding exhaust gas to the turbine rotor (10), the ratio $D_T/D_V$ of the turbine rotor diameter $D_T$ to the compressor wheel diameter $D_V$ being governed by the relationship $$D_T/D_V > JK^*Asy,$$

wherein

J denotes a constant in the range between 1 and 1.05.

K denotes a parameter which varies as function of the swept volume $V_H$ of the internal combustion engine (1), which is to be determined according to the relationship $$K = 0.15\sqrt{\frac{V_H}{14}} \approx 0.04\sqrt{V_H}$$

as a function of the displacement volume $V_H$ measured in liters, and

Asy denotes a turbine-specific degree of asymmetry, which is to be determined according to the relationship $$Asy = \Phi_{1,S}/\Phi_{2,S}$$

as a function of the critical flow rate parameter $\Phi_{1,S}$ in the area of the choke limit for the first exhaust gas flow passage (7) of the exhaust gas turbine (3) and the corresponding flow rate parameter $\Phi_{2,S}$ for the second exhaust gas flow passage (8) of the exhaust gas turbine (3).

\* \* \* \* \*